Dec. 29, 1931.  H. HUEBER  1,839,175
WINDSHIELD CLEANER
Filed Aug. 3, 1929
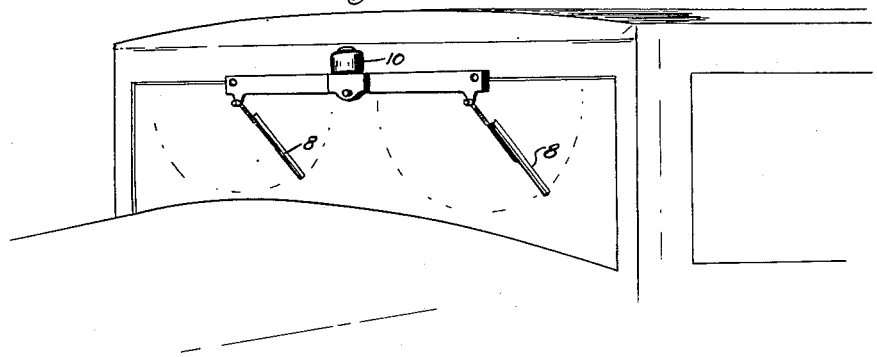
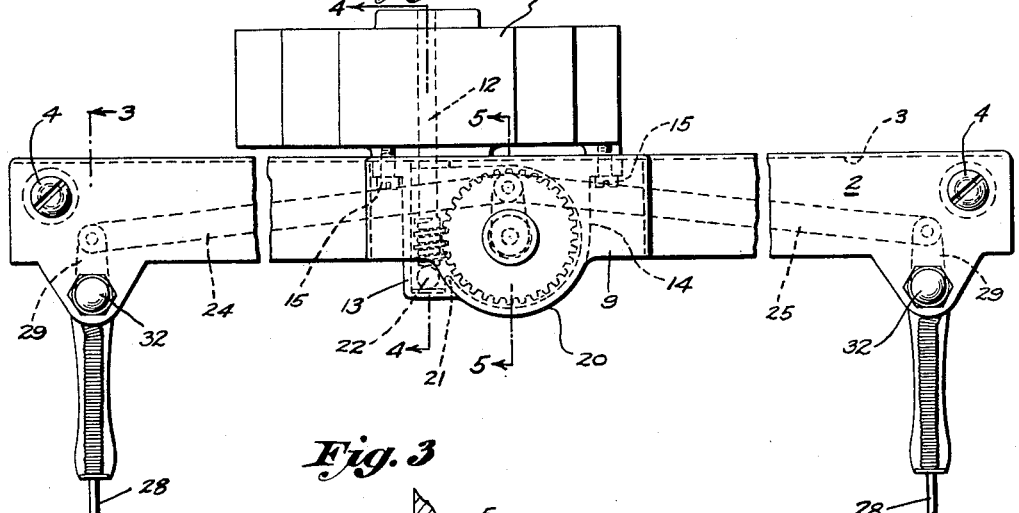
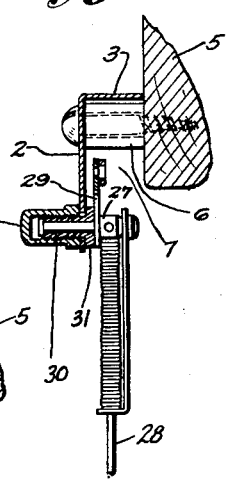
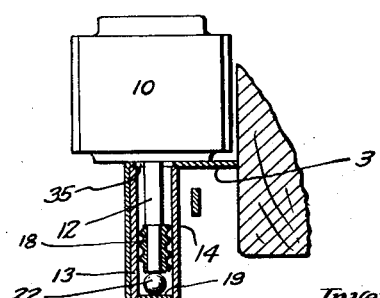
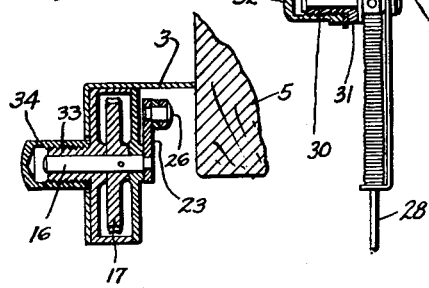
Inventor
Henry Hueber
by Barton A. Bean
Attorney Patented Dec. 29, 1931

1,839,175

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER

Application filed August 3, 1929. Serial No. 383,193.

This invention relates to automatic windshield cleaners for vehicles and particularly to windshield cleaners adapted to be operated by a constantly rotating motor.

Previous devices of this character have presented a variety of difficulties arising from the combined problem of readily assembling the motor with the transmission mechanism, dissipating the thrust in the transmission mechanism and arranging the various parts so that the conformity of the whole fits conveniently into the space available for mounting the device adjacent the upper edge of the windshield.

The objects of this invention are to eliminate the objectionable features of previous devices of this character and improve on the construction, operation and assembly of the cleaner; to provide a device which may be mounted upon the vehicle as an integral unit without the disadvantage of locating and aligning a plurality of parts; and to provide for an improved wiper mounting and drive.

In the drawings:

Fig. 1 is a fragmentary perspective view of an automobile showing the windshield thereof with the improved cleaner positioned adjacent to it.

Fig. 2 is a front elevational view of the device.

Fig. 3 is a cross section on the line 3—3 of Fig. 2.

Fig. 4 is a cross section on the line 4—4 of Fig. 2, parts being left in elevation.

Fig. 5 is a cross section on the line 5—5 of Fig. 2.

In the drawings, the main housing takes the form of an angular mounting or cover plate having a vertical front flange 2 and a horizontal top flange or cover extension 3. Screws or bolts 4 engage apertures in the front flange 2 for securing the mounting plate to the header bar 5 of an automobile windshield. Spacing bushings 6, engaged by the screws 4 and disposed between the front flange 2 of the mounting plate and the header bar 5, space said plate from the header bar to provide a transmission compartment 7 to receive the driving means for a pair of wiper blades 8 which latter are pivotally mounted at the outer ends of said mounting plate.

The front wall 2 has an enlarged or outwardly offset central portion 9 for supporting a driving motor 10, actuated by electricity, fluid pressure or any other suitable form of energy, and for housing suitable means for transforming the continuous and comparatively fast rotary movement of the motor into a slower, reciprocating wiper motion. The motor 10 is secured to the top flange 3 of the mounting plate and has its rotor shaft 12 vertically disposed and extended downwardly into a well 13 of a transmission housing 14 which is secured to the under side of the flange 3 of the mounting plate 1 as by screws 15 which latter preferably are also adapted to secure the motor 10. A shaft 16 journalled in the housing 14 carries a worm wheel 17, fixed thereto for intermeshing engagement with a worm 18 mounted at the end of the rotor shaft 12.

A thrust washer 19 is positioned in the well 13 formed in the bottom of the housing 14 by the lip 21, in axial alignment with the shaft 12, and a hardened steel ball 22 acts between the lower end of the shaft and the washer 19 to minimize the friction resulting from the thrust of the worm 18. The well 13, or the housing 14, opens upwardly through the cover or top wall 3 so that the shaft 12 may readily be positioned in place. This construction facilitates the removal and assembly of the motor, its shaft, and the worm with the remaining structure in the event that their replacement or repair becomes necessary.

The general assembly provides for the use of a motor revolving in a horizontal plane, with the motor shaft disposed vertically and depending from the motor, the sole support for the shaft outside of the motor bearings being the thrust bearing 22 which supports the shaft at its free end and receives the thrust of the rotating shaft downwardly so as to limit the friction. The disposition of the ball thrust bearing in the well 13 insures a thorough lubricating action since the well contains a quantity of lubricant to be transmitted by the ball to the worm 18. By mounting the motor above the supporting or mounting plate the entire weight of the motor is supported directly thereby, and the attaching screws 15 carry practically no supporting strain but serve merely to secure the motor to the plate or housing.

A crank 23 is fixed to the shaft 16 and at its free end is rotatably joined to a pair of links 24 and 25 by a rivet 26. The links 24 and 25 are each adapted to oscillate a wiper shaft 27 and a wiper arm 28 by cooperating with a lever 29 which is fixed to said wiper shaft. The stub shaft 27 is journalled in a bearing sleeve 30 which is inserted through an opening in the front flange 2 from the rear side thereof and has a shoulder 31 to seat against the inner face or side of said flange. A cap nut 32 is threaded over the protruding forward end of the sleeve and serves as a grease reservoir for lubricating the journal bearing. The cap 32 cooperates with the shoulder 31 in securely clamping the bearing sleeve to the front flange of the housing.

The housing 14 is also provided with an externally threaded hub 33, at the bearing of the shaft 16, which cooperates with an internally threaded grease cup 34 for lubricating the bearing of the shaft 14. The housing 14 is further provided with a gear pocket 20 separated from the well by the lip 21 and which may serve as an additional lubricating reservoir into which the gear 17 may dip so as to effectively provide for lubricating the meshing contact between the worm 18 and the gear 17.

In assembling the windshield cleaner the housing 14 is inserted upwardly beneath the flange 2 and the shaft 12 with its carried worm 18 is inserted downwardly through an opening 35, in the top flange 3, and into the well 13 so as to mesh with the teeth of the gear 12. The screws 15 are then applied so as to secure the housing 14 against the underside of the flange 3 and the motor 10 to the top side thereof. The wiper shafts are mounted in their respective bearings, and the links 24 and 25 operatively connected to the crank 23.

In operation the motor 10, whether it be of the electric type or of the fluid pressure turbine type, is set in motion so as to continuously rotate the gear 17 which through the crank 23 will oscillate the crank arms 29 and impart an oscillatory movement to the wiper blades 8, as indicated by the dotted lines in Fig. 1. The entire mechanism is compact and capable of being readily mounted on a motor vehicle windshield. The weight of the motor is supported entirely by the housing or mounting plate and has no strains applied thereon which would tend to distort or interfere with the efficient operation thereof. The general relationship of the parts provides a convenient power transmission, simplifying the speed reduction movement and at the same time supplying a maximum power from the motor unit to the windshield cleaner movement. Ready access may be obtained to the transmission simply by removing the screws 15 and withdrawing the casing 14 downwardly. The entire weight of the motor and transmission is supported centrally by the mounting housing which results in a practical drive for the tandem wipers.

What is claimed is:

A windshield cleaner comprising a support having a transmission housing with an upwardly opening well, a motor mounted on the upper side of the support and having its shaft depending substantially perpendicularly within the well, a ball disposed within the bottom of the well with the free lower end of the shaft resting on and supported by said ball, said motor with its shaft being removable and replaceable perpendicularly, means detachably securing the motor to said support, power transmission means within the housing and operatively connected to the shaft, and a wiper operatively connected to the transmission means.

HENRY HUEBER.